US012614669B2

(12) United States Patent (10) Patent No.: US 12,614,669 B2
Kim et al. (45) Date of Patent: Apr. 28, 2026

(54) MULTILAYER CERAMIC CAPACITOR INCLUDING A DUMMY ELECTRODE

(71) Applicant: SAMSUNG ELECTRO-MECHANICS CO., LTD., Suwon-si (KR)

(72) Inventors: Seonho Kim, Suwon-si (KR); Chae Min Park, Suwon-si (KR); Yong-Won Seo, Suwon-si (KR); Youngjun Cha, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 106 days.

(21) Appl. No.: 18/585,603

(22) Filed: Feb. 23, 2024

(65) Prior Publication Data

US 2024/0304386 A1 Sep. 12, 2024

(30) Foreign Application Priority Data

Mar. 10, 2023 (KR) ........................ 10-2023-0031803

(51) Int. Cl.
*H01G 4/012* (2006.01)
*H01G 4/232* (2006.01)
*H01G 4/30* (2006.01)
(52) U.S. Cl.
CPC ........... *H01G 4/012* (2013.01); *H01G 4/2325* (2013.01); *H01G 4/30* (2013.01)
(58) Field of Classification Search
CPC ........ H01G 4/012; H01G 4/2325; H01G 4/30; H01G 4/232; H01G 2/065; H01G 4/12; H01G 4/224; H01G 4/1227
See application file for complete search history.

(56) References Cited

U.S. PATENT DOCUMENTS 3,496,434 A * 2/1970 Prokopowicz ........... H01G 4/30
361/321.2
3,721,871 A * 3/1973 Heron ...................... H01G 4/30
361/275.1

(Continued)

FOREIGN PATENT DOCUMENTS

CA 0900615 A 5/1972
JP 2000106322 A 4/2000

(Continued)

OTHER PUBLICATIONS

Extended European Search Report dated Feb. 3, 2025 issued in corresponding European Patent Application No. 24161418.9.

*Primary Examiner* — Timothy J. Dole
*Assistant Examiner* — Daniel M Dubuisson
(74) *Attorney, Agent, or Firm* — Morgan, Lewis & Bockius LLP

(57) ABSTRACT

A multilayer ceramic capacitor includes: a ceramic body; external electrodes each including a connection portion covering a part of an end surface of the ceramic body in a length direction, and a band portion extending from the connection portion and covering a part of both side surfaces of the ceramic body in a width direction and a part of one surface in a thickness direction; a plurality of internal electrodes stacked within the ceramic body with a dielectric layer interposed therebetween and alternately connected to the external electrodes, respectively; cover layers respectively disposed outside the plurality of internal electrodes along the thickness direction within the ceramic body; and a dummy electrode disposed within the first cover layer, wherein the first cover layer includes an exposed surface, which is a portion of the end surface exposed by the connection portion.

17 Claims, 9 Drawing Sheets

(56)        References Cited

U.S. PATENT DOCUMENTS

| | | | | |
|---|---|---|---|---|
| 5,894,401 | A | * | 4/1999 | Asakura ................. H01G 4/255 |
| | | | | 361/321.1 |
| 2008/0123249 | A1 | * | 5/2008 | Kunishi ................... H01G 4/30 |
| | | | | 361/306.3 |
| 2010/0118467 | A1 | * | 5/2010 | Takeuchi ............... H01G 4/232 |
| | | | | 361/306.3 |
| 2012/0019978 | A1 | | 1/2012 | Yoshida |
| 2012/0188682 | A1 | * | 7/2012 | Sato ....................... H01G 4/232 |
| | | | | 336/200 |
| 2015/0016014 | A1 | | 1/2015 | Park et al. |
| 2018/0374646 | A1 | * | 12/2018 | Ward ....................... H01G 4/30 |
| 2019/0287720 | A1 | * | 9/2019 | Mori ....................... H01G 4/232 |
| 2020/0152382 | A1 | | 5/2020 | Sakurai et al. |
| 2022/0172900 | A1 | * | 6/2022 | Shimada ................... H01G 4/30 |
| 2024/0395464 | A1 | * | 11/2024 | Nishimura ............. H01G 4/008 |
| 2025/0104918 | A1 | * | 3/2025 | Lim ....................... H01G 13/00 |
| 2025/0191844 | A1 | * | 6/2025 | Muramatsu ............ H01G 4/005 |

FOREIGN PATENT DOCUMENTS

| | | | |
|---|---|---|---|
| JP | 2006-237078 | A | 9/2006 |
| JP | 2012-044148 | A | 3/2012 |
| JP | 2020-167367 | A | 10/2020 |
| KR | 10-2015-0007581 | A | 1/2015 |
| KR | 10-2022-0103380 | A | 7/2022 |

* cited by examiner

MULTILAYER CERAMIC CAPACITOR INCLUDING A DUMMY ELECTRODE

CROSS-REFERENCE TO RELATED APPLICATION

This application claims the benefit of priority to Korean Patent Application No. 10-2023-0031803 filed on Mar. 10, 2023 in the Korean Intellectual Property Office, the entire contents of which are incorporated herein by reference.

TECHNICAL FIELD

The present disclosure relates to a multilayer ceramic capacitor.

BACKGROUND

An electronic component using ceramic materials includes a capacitor, an inductor, a piezoelectric device, a varistor, or a thermistor, etc. Among such ceramic electronic components, a multilayer ceramic capacitor (MLCC) may be used in various electronic devices due to its small size, high capacity, and easy mounting.

For example, the multilayer ceramic capacitor may be used for chip-type capacitors that are mounted in boards of various electronic products to charge or discharge electricity, including imaging devices such as liquid crystal displays (LCD), plasma display panels (PDP), and organic light-emitting diode (OLED) displays, computers, personal portable terminals, and smartphones.

With the recent trend of downsizing and thinning of electronic products, there is a growing demand for multilayer ceramic capacitors that are thinner than conventional multilayer ceramic capacitors. Particularly, since the multilayer ceramic capacitors that are thinned to the extent that the width is 1.5 times or 2 times more than the thickness are considerably thinner than the width, when the substrate is bent when it is mounted on the substrate, there is a risk of a physical damage such as occurrences of flex cracks. Furthermore, in the case of the multilayer ceramic capacitor in which the upper surface of the ceramic body is not covered by an external electrode to reduce the thickness, the possibility of breakage and moisture penetration due to external impacts increases, and moisture resistance reliability may decrease.

The above information disclosed in this Background section is to aid in the understanding of the background of the present disclosure, and should not be taken as acknowledgement that this information forms any part of prior art.

SUMMARY

One aspect of the embodiment is to provide a multilayer ceramic capacitor that reduces the possibility of a warpage during sintering and a flex crack occurrence during substrate mounting.

Another aspect of the embodiment is to provide a multilayer ceramic capacitor with improved moisture resistance by lowering the possibility of moisture penetration.

However, the object to be achieved by the embodiments of the present invention is not limited to the above-mentioned objects, but may be variously expanded without departing from the technical spirit of the present invention.

A multilayer ceramic capacitor according to an embodiment includes: a ceramic body having a predetermined size of length, width, and thickness, with the thickness being smaller than the width; first and second external electrodes respectively including first and second connection portions covering a part of both end surfaces spaced apart from each other in a length direction of the ceramic body, and first and second band portions that extends from the first and second connection portions, respectively, and covers a part of both side surfaces of the ceramic body in a width direction and a part of one surface in a thickness direction; a plurality of first and second internal electrodes stacked within the ceramic body with a dielectric layer interposed therebetween and alternately drawn out to the both end surfaces of the ceramic body to be connected to the first and second external electrodes, respectively; first and second cover layers respectively disposed outside on both sides of the plurality of first and second internal electrodes in the thickness direction within the ceramic body; and a dummy electrode disposed within the first cover layer, wherein the first cover layer includes an exposed surface, which is a portion of the both end surfaces of the ceramic body exposed by at least one of the first and second connection portions.

The dummy electrode may be in contact with the exposed surface or spaced apart from the exposed surface.

A length $L1$ of the dummy electrode may be a distance between both ends of the dummy electrode along the length direction, a length $L2$ of one of the first and second band portions may be a distance between an adjacent end surface of the both end surfaces of the ceramic body or an imaginary extension thereof and an edge of the one of the first and second band portions opposite the adjacent end surface of the ceramic body, and the length $L1$ of the dummy electrode may be less than the length $L2$ of the one of the first and second band portions.

An edge of the dummy electrode that is opposite an adjacent end surface of the both end surfaces of the ceramic body and an edge of one of the first and second band portions that is opposite the adjacent end surface of the ceramic body may be disposed on the same straight line in the thickness direction.

The multilayer ceramic capacitor may further include an active region, which is a region where the plurality of first and second internal electrodes overlap in the thickness direction; and a margin region, which is a region between the active region and one of the both end surfaces of the ceramic body, a length $L1$ of the dummy electrode may be a distance between both ends of the dummy electrode in the length direction, a length $L3$ of the margin region may be a distance between both ends of the margin region in the length direction, and the length $L1$ of the dummy electrode may be greater than the length $L3$ of the margin region.

The dummy electrode may include a plurality of layers.

Each layer of the dummy electrode may be spaced apart from each other in the thickness direction.

The dummy electrode may include nickel (Ni), copper (Cu), tin (Sn), palladium (Pd), gold (Au), or alloys thereof.

The thickness $T1$ of the first cover layer may be the distance between the internal electrode closest to the outer surface or an imaginary extension thereof of the first cover layer in the thickness direction among the plurality of first and second internal electrode, and the outer surface or an imaginary extension thereof of the first cover layer in the thickness direction, the thickness $T2$ of the second cover layer may be the distance between the internal electrode closest to the outer surface or an imaginary extension thereof of the second cover layer in the thickness direction among the plurality of first and second internal electrodes, and the outer surface of the second cover layer or an imaginary extension thereof in the thickness direction, and the thickness T1 of the first cover layer may be greater than the thickness T2 of the second cover layer.

The thickness T1 of the first cover layer may be at least twice the thickness T2 of the second cover layer.

The height H of the exposed surface may be the distance between the outer surface or an imaginary extension thereof of the first cover layer in the thickness direction and the edge of the connection portion that is on the first cover layer side, the thickness T1 of the first cover layer may be the distance between the internal electrode closest to the outer surface or an imaginary extension thereof of the first cover layer in the thickness direction among the plurality of first and second internal electrodes, and the outer surface or an imaginary extension thereof of the first cover layer in the thickness direction, and the height H of the exposed surface may be smaller than the thickness T1 of the first cover layer.

The band portion may extend in the length direction from the connection portion and cover a portion of the second cover layer.

A seed electrode layer may be disposed between the band portion and the second cover layer.

The multilayer ceramic capacitor may further include an active region that is a region where the plurality of first and second internal electrodes overlaps in the thickness direction; and a margin region that is a region between the active region and both end surfaces of the ceramic body, the length L3 of the margin region may be the distance between both ends of the margin region in the length direction, the length L4 of the seed electrode layer may be the distance between the end surface or an imaginary extension thereof of the ceramic body and the edge of the seed electrode layer that is opposite the end surface of the ceramic body, and the length L4 of the seed electrode layer may be greater than the length L3 of the margin region.

The length L2 of the band portion may be the distance between the end surface or an imaginary extension thereof of the ceramic body and the edge of the band portion that is opposite the end surface of the ceramic body, and the length L4 of the seed electrode layer may be less than the length L2 of the band portion.

The dummy electrode may project outwardly from the exposed surface.

The length L1 of the dummy electrode may be the distance between both ends of the dummy electrode along the length direction, the length L2 of the band portion may be the distance between the end surface or an imaginary extension thereof of the ceramic body and the edge of the band portion that is opposite the end surface of the ceramic body, and the length L1 of the dummy electrode may be less than the length L2 of the band portion.

According to the multilayer ceramic capacitor according to an embodiment, by forming the upper cover layer having the exposed surface exposed by the external electrode thicker than the lower cover layer, it is possible to improve a moisture resistance reliability by reducing a possibility of a breakage and a moisture penetration.

Also, according to the multilayer ceramic capacitor according to an embodiment, by disposing the dummy electrode in the upper cover layer having the exposed surface exposed by the external electrode, it is possible to suppress the occurrence of warpage during the sintering and the generation of a flex crack during substrate mounting.

BRIEF DESCRIPTION OF THE DRAWINGS

FIG. 5 is an enlarged view of a part of FIG. 2.

FIG. 6 is an enlarged view of another part of FIG. 2.

DETAILED DESCRIPTION

Figure 1:
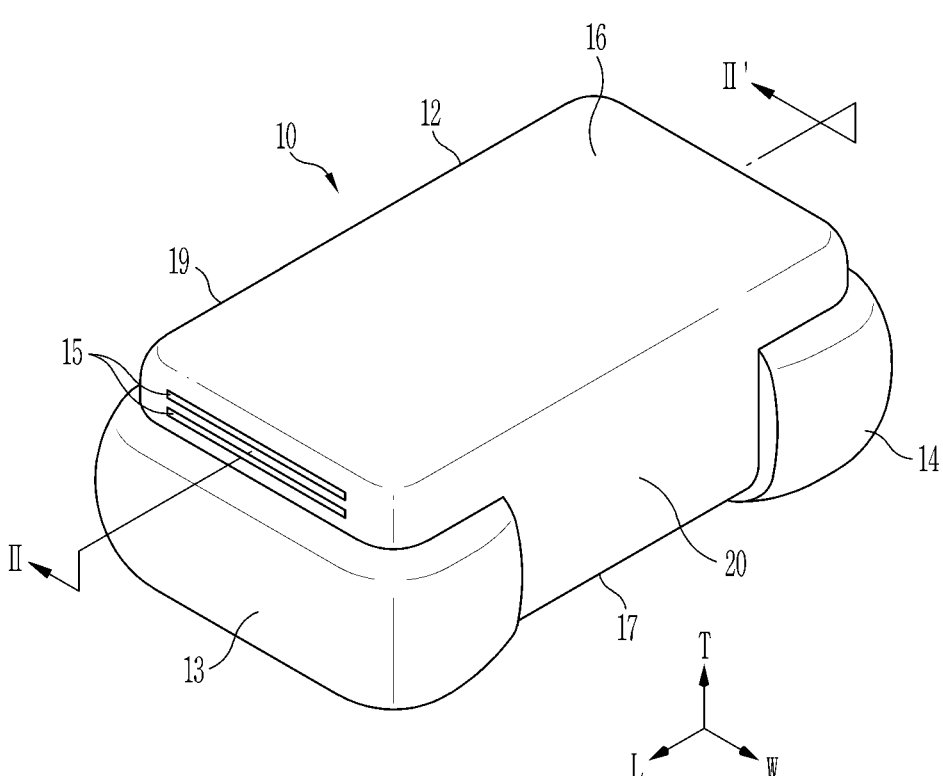
FIG. 1 is a perspective view schematically showing a multilayer ceramic capacitor according to an embodiment of the present disclosure.

Hereinafter, an embodiment of the present disclosure will be described in detail and thus a person of an ordinary skill in the technical field to which the present disclosure belongs can easily implement it with reference to the accompanying drawing. The drawings and description are to be regarded as illustrative in nature and not restrictive. Like reference numerals designate like elements throughout the specification. In addition, in the accompanying drawings, some constituent elements are exaggerated, omitted, or schematically shown, and the size of each constituent element does not fully reflect the actual size.

The attached drawing is only for easy understanding of the embodiment disclosed in the present specification, and the technical idea disclosed in this specification is not limited by the attached drawing, and it should be understood to include all changes and equivalents included in the spirit and technical range of the present disclosure.

Terms including ordinal numbers such as first, second, and the like may be used to describe various configurations elements, but the constituent elements are not limited by the terms. The terms are only used for the purpose of distinguishing one constituent element from another.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, throughout the specification, the word "on" a target element will be understood to mean positioned above or below the target element, and will not necessarily be understood to mean positioned "at an upper side" based on an opposite to gravity direction.

In the specification, terms such as "comprise" or "include" are intended to designate the existence of features, numbers, steps, operations, constituent elements, parts, or combinations thereof described in the specification, and it is to be understood that this does not preclude in advance the possibility of the presence or addition of one or more other features or numbers, steps, actions, constituent elements, parts or combinations thereof. Unless defined otherwise, all terms used herein, including technical or scientific terms, have the same meaning as commonly understood by a person of an ordinary skill in the art to which the present disclosure belongs.

Further, throughout the specification, the phrase "on a plane" means viewing a target portion from the top, and the phrase "on a cross-section" means viewing a cross-section formed by vertically cutting a target portion from the side.

In addition, throughout the specification, when "connected to" in the entire specification, this does not only mean that two or more constituent elements are directly connected, but also means that two or more constituent elements are indirectly connected, physically connected, and electrically connected through other constituent elements, or being referred to by different names depending on the position or function, while being integral.

Figure 2:
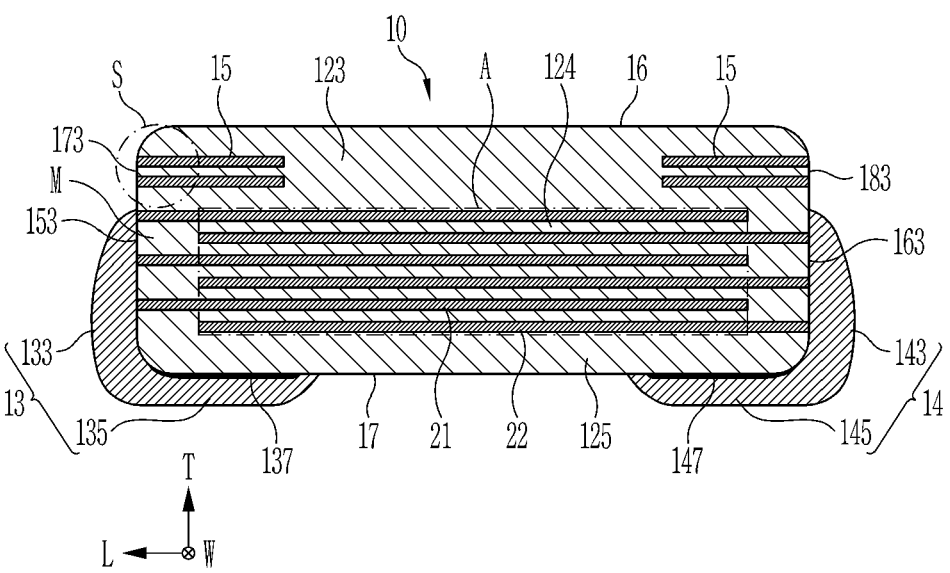
FIG. 2 is a cross-sectional view taken along line II-II' of FIG. 1.

FIG. 1 is a perspective view schematically showing a multilayer ceramic capacitor according to an embodiment. FIG. 2 is a cross-sectional view taken along line II-II' of FIG. 1.

Referring to FIG. 1 and FIG. 2, a multilayer ceramic capacitor 10 according to the present embodiment includes a ceramic body 12, first and second external electrodes 13 and 14, a plurality of first and second internal electrodes 21 and 22, and a dummy electrode 15.

The ceramic body 12 may be formed by stacking a plurality of dielectric layers 124 in a thickness direction T and then sintering them. Here, each of the plurality of adjacent dielectric layers 124 of the ceramic body 12 may be integrated with each other in a state in which the boundaries therebetween are unclear. For example, the boundaries between each of the adjacent dielectric layers 124 of the ceramic body 12 may be so integrated that they are difficult to recognize without using a scanning electron microscope (SEM).

The ceramic body 12 may have an approximately hexahedral shape with a predetermined size of length, width, and thickness along directions intersecting each other, with the thickness being less than the width, but the present disclosure is not limited thereto. For example, the ceramic body 12 may have an approximately rectangular parallelepiped shape, but the portion corresponding to the corner or the vertex may have a rounded shape.

In the present embodiment, for the sake of convenience of description, the surfaces facing each other in the thickness direction T on which the dielectric layers 124 of the ceramic body 12 are stacked are defined as an upper surface 16 and a lower surface 17, the surfaces facing each other in the length direction L of the ceramic body 12 connecting the upper surface and the lower surface are defined as first and second end surfaces 153 and 163, and the surfaces facing each other in the width direction W intersecting vertically to the first and second end surfaces 153 and 163 are defined as first and second side surfaces 19 and 20.

Meanwhile, within the ceramic body 12, first and second cover layers 123 and 125 may be disposed outside on both sides of the plurality of first and second internal electrodes 21 and 22 along the thickness direction T of the ceramic body 12, respectively.

That is, in the ceramic body 12, the first cover layer 123 having a predetermined thickness may be provided on an upper portion of the internal electrode at the top, and the second cover layer 125 may be provided on a lower portion of the internal electrode at the bottom. The first cover layer 123 and the second cover layer 125 may have the same composition as the dielectric layer 124, and may be formed by stacking one or more dielectric layers that do not include an internal electrode on the upper portion of the internal electrode at the top and the lower portion of the internal electrode at the bottom of the ceramic body 12.

The first and second cover layers 123 and 125 may serve to prevent damage to the first and second internal electrodes 21 and 22 by physical or chemical stress.

The dielectric layer 124 may include a high permittivity ceramic material. For example, the ceramic material may include a dielectric ceramic including a component such as $BaTiO_3$, $CaTiO_3$, $SrTiO_3$, or $CaZrO_3$, etc. In addition, auxiliary components such as a Mn compound, an Fe compound, a Cr compound, a Co compound, and a Ni compound may be further included in these components. For example, the dielectric layer may be $(Ba_{1-x}Ca_x) TiO_3$, $Ba (Ti_{1-y}Ca_y) O_3$, $(Ba_{1-x}Ca_x) (Ti_{1-y}Zr_y)O_3$ or $Ba (Ti_{1-y}Zr_y)O_3$, etc., in which Ca (calcium) and Zr (zirconium) are partially dissolved in $BaTiO_3$, however the present disclosure is not limited thereto.

Also, the dielectric layer 124 may further include one or more of ceramic additives, organic solvents, plasticizers, binders, and dispersants. The ceramic additives may be, for example, a transition metal oxide or carbide, rare earth elements, magnesium (Mg), or aluminum (Al).

As an example, the average thickness of the dielectric layer 111 may be 0.5 μm to 10 μm, but the present disclosure is not limited thereto.

The first and second external electrodes 13 and 14 may be formed by a conductive paste including a conductive metal. For example, the first and second external electrodes may be formed by a method of dipping the ceramic body 12 in the conductive paste. The conductive metal may include nickel (Ni), copper (Cu), palladium (Pd), gold (Au), or alloys thereof, but the present disclosure is not limited thereto.

The first and second external electrodes 13 and 14 are disposed at both ends of the ceramic body 12 in the length direction L and respectively include first and second connection portions 133 and 143, and first and second band portions 135 and 145.

The first connection portion 133 covers a part of the first end surface 153 in the length direction L of the ceramic body 12 and is a part that is electrically connected to the exposed ends of the first or second internal electrode 21 or 22.

The connection portion 143 covers a part of the second end surface 163 in the length direction L of the ceramic body 12, and is a part that is electrically connected to the exposed ends of the first or second internal electrode 21 or 22.

The first and second band portions 135 and 145 extend from the first and second connection portions 133 and 143, respectively, to cover a portion of the lower surface 17 of the and a portion of the first and second side surfaces 19 and 20 of the ceramic body 12.

The first band portion 135 may extend from the first connection portion 133 along the length direction L of the ceramic body 12 and cover a portion of the second cover layer 125.

The second band portion 145 may extend from the second connection portion 143 in the length direction L of the ceramic body 12 and cover a portion of the second cover layer 125.

Seed electrode layers 137 and 147 may be printed between the first and second band portions 135 and 145 and the lower surface 17 of the ceramic body 12. That is, the seed electrode layer 137 may be printed between the first band portion 135 and the lower surface 17 of the ceramic body 12, and the seed electrode layer 137 may be printed between the second band portion 145 and the lower surface 17 of the ceramic body 12.

The seed electrode layers 137 and 147 may be formed by a method of printing a paste including a conductive metal (e.g., nickel (Ni)). The seed electrode layers 137 and 147 are regions including a sintering inhibitor in addition to the conductive metal.

The first connection portion 133 covers a part of the first end surface 153 of the ceramic body 12. The first connection portion 133 extends from the bottom to the upward side of the first end surface 153 along the thickness direction T of the ceramic body 12, but does not extend to the top. That is, there is a gap between the top of the first connection portion 133 and the top of the first end surface 153. Accordingly, an upper portion of the first end surface 153 is exposed by the first connection portion 133. Here, a portion of the first end surface 153 that is not covered by the first connection portion 133 is referred to as a first exposed surface 173.

The connection portion 143 covers a part of the second end surface 163 of the ceramic body. The second connection portion 143 extends from the bottom to the upward side of the second end surface 163 along the thickness direction T of the ceramic body 12, but does not extend to the top. That is, there is a gap between the top of the second connection portion 143 and the top of the second end surface 163. Accordingly, an upper portion of the second end surface 163 is exposed by the second connection portion 143. Here, a portion of the second end surface 163 that is not covered by the connection portion 143 is referred to as a second exposed surface 183.

The first and second exposed surfaces 173 and 183 may be a part of the first cover layer 123. That is, the first and second exposed surfaces 173 and 183 may be parts of both end surfaces of the first cover layer 123 that face each other in the length direction L of the ceramic body 12. A dummy electrode 15 is disposed within the first cover layer 123, which includes the first and second exposed surfaces 173 and 183. The dummy electrodes 15 and 15 may be in contact with the first and second exposed surfaces 173 and 183 or project outwardly from the first and second exposed surfaces 173 and 183. The dummy electrode will be discussed in more detail below.

A plurality of first and second internal electrodes 21 and 22 are alternately stacked with a dielectric layer 124 interposed therebetween. The first and second internal electrodes 21 and 22 may be formed and stacked on the ceramic sheet forming the dielectric layer 124, and then alternately arranged in the thickness direction in the ceramic body 12 with one dielectric layer 124 interposed therebetween by sintering. These first and second internal electrodes 21 and 22 are electrodes having different polarities, may be disposed facing each other along the stacking direction of the dielectric layer 124, and electrically insulated from each other by the intervening dielectric layer 124.

The first and second internal electrodes 21 and 22 are disposed to be offset from each other in the length direction with the dielectric layer 124 interposed therebetween, and one ends thereof are exposed through the first and second end surfaces 153 and 163 of the length direction L of the ceramic body 12, respectively. In the above manner, the ends of the first and second internal electrodes 21 and 22, which are alternately exposed through first and second end surfaces 153 and 163 of the length direction L of the ceramic body 12, may be electrically connected to the first and second connection portions 133 and 143 of the first and second external electrodes 13 and 14, respectively, on the first and second end surfaces 153 and 163 of the length direction L of the ceramic body 12. In addition, the first and second internal electrodes 21 and 22 comprise a conductive metal, which may include for example, nickel (Ni) or a nickel (Ni) alloy, but the present disclosure is not limited thereto.

According to the above configuration, when a predetermined voltage is applied to the first and second external electrodes 13 and 14, charges are accumulated between the first and second internal electrodes 21 and 22 facing each other. Here, the capacitance of the multilayer ceramic capacitor 10 is proportional to the overlapping area of the first and second internal electrodes 21 and 22 overlapping each other along the stacking direction of the dielectric layer 124.

Figure 3:
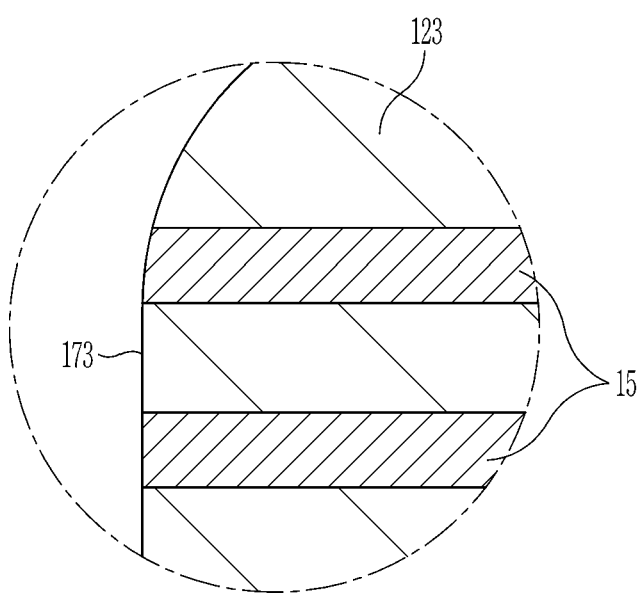
FIG. 3 is a schematically enlarged cross-sectional view of a region S of FIG. 2.
Figure 4:
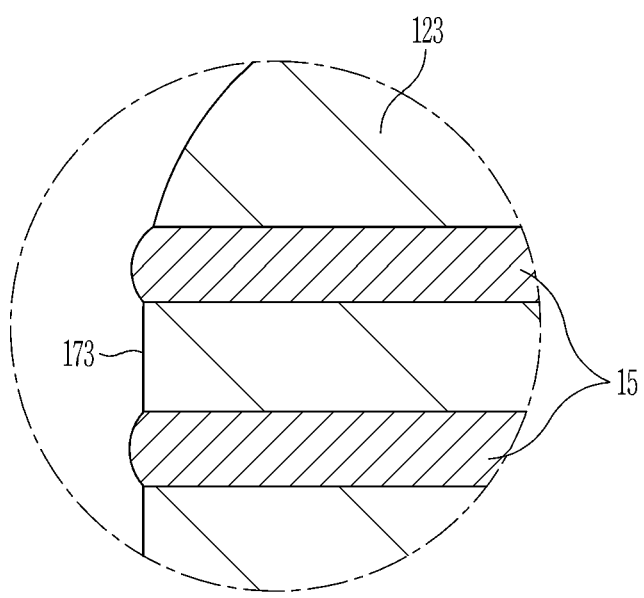
FIG. 4 is a schematic cross-sectional view of another shape of a region S of FIG. 2.
Figure 5:
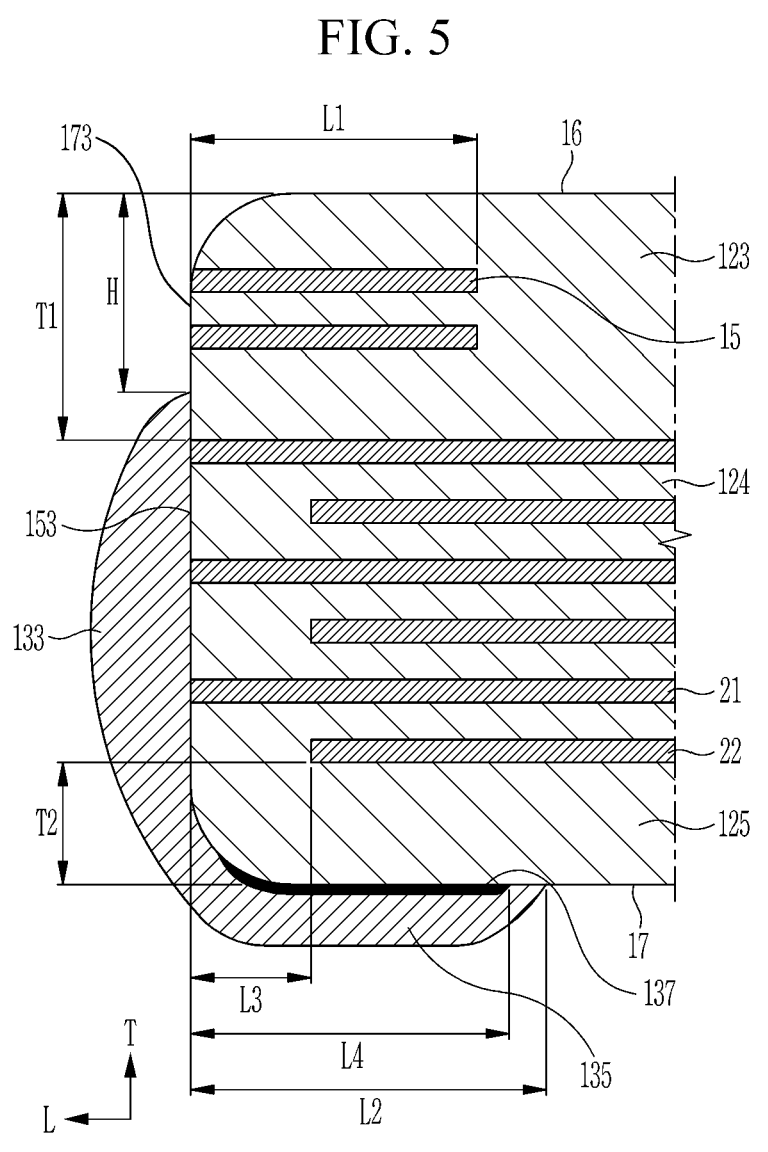
Figure 6:
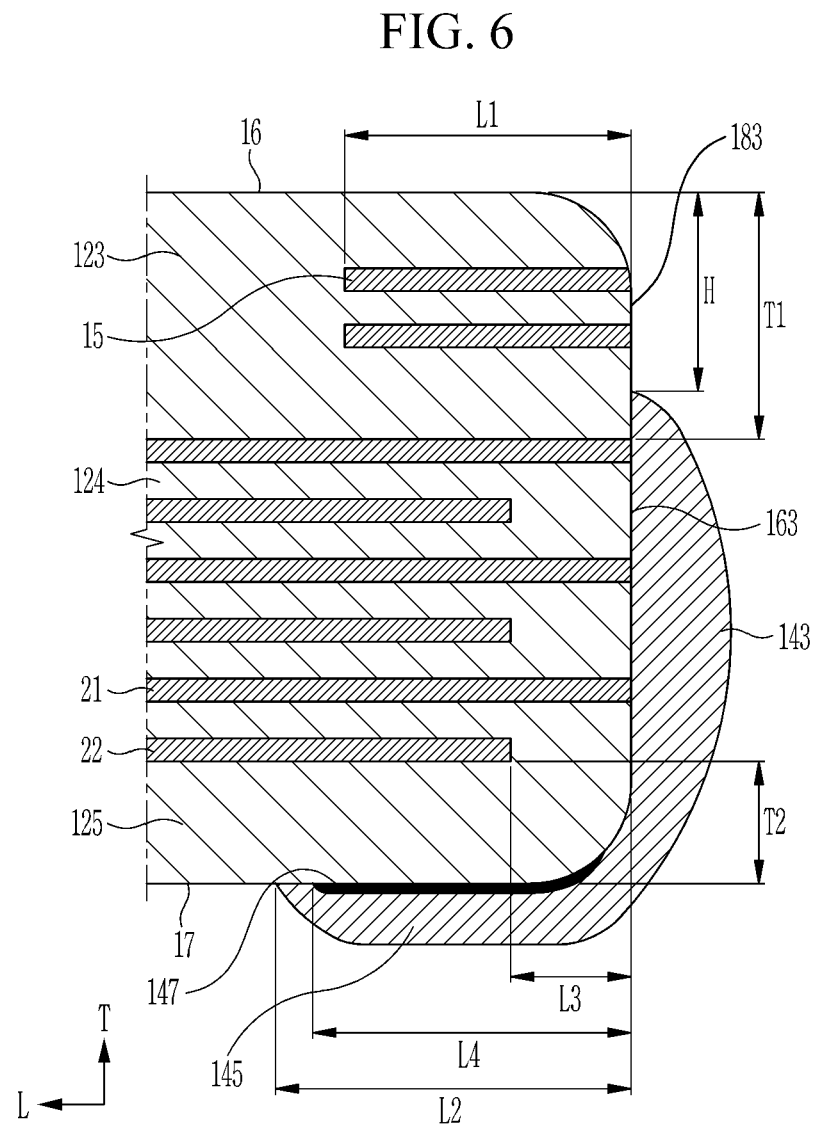

Hereinafter, the present embodiment will be described in more detail with reference to FIG. 3, FIG. 4, FIG. 5, and FIG. 6 along with FIG. 1 and FIG. 2. FIG. 3 is a schematically enlarged cross-sectional view of a region S of FIG. 2. FIG. 4 is a schematic cross-sectional view of another shape of a region S of FIG. 2. FIG. 5 is an enlarged view of a part of FIG. 2. FIG. 6 is an enlarged view of another part of FIG. 2.

A first cover layer 123 includes a first exposed surface 173 and a second exposed surface 183. The first exposed surface 173 is a portion of the first end surface 153 of the ceramic body 12 that is not covered by the first external electrode 13, and the second exposed surface 183 is a portion of the second end surface 163 of the ceramic body 12 that is not covered by the second external electrode 14. In other words, the first exposed surface 173 as a part of the first end surface 153 is a surface exposed by the first external electrode 13, and the second exposed surface 183 as a part of the second end surface 163 is a surface exposed by the second external electrode 14.

The second cover layer 125 does not include an exposed surface. That is, both end surfaces of the second cover layer 125 in the length direction L of the ceramic body 12 is covered by the first and second external electrodes 13 and 14.

While both end surfaces of the second cover layer 125 are entirely covered by the first and second external electrodes 13 and 14, both end surfaces of the first cover layer 123 are partially covered by the first and second external electrodes 13 and 14, and have the exposed surfaces 173 and 183.

The thickness T1 of the first cover layer 123 may be larger than the thickness T2 of the second cover layer 125. For example, the thickness T1 of the first cover layer may be at least twice the thickness T2 of the second cover layer and less than half of the thickness of the ceramic body 12. Here, T1 means a distance between the internal electrode closest to the outer surface or an imaginary extension thereof of the first cover layer 123 in the thickness direction T of the ceramic body 12 among the plurality of first and second internal electrodes 21 and 22, and the outer surface or an imaginary extension thereof of the first cover layer 123 in the thickness direction T of the ceramic body 12, and T2 means a distance between the internal electrode closest to the outer surface or an imaginary extension thereof of the second cover layer 125 in the thickness direction T of the ceramic body 12 among the plurality of first and second internal electrodes 21 and 22, and the outer surface or an imaginary extension thereof of the second cover layer 125 in the thickness direction T of the ceramic body 12.

In the multilayer ceramic capacitor 10 according to the present embodiment, a smaller portion of the first cover layer 123 is covered by the first and second external electrodes 13 and 14 when compared to the second cover layer 125. Therefore, even if an external force of the same magnitude is applied to the first cover layer 123 and the second cover layer 125, the first cover layer 123 may be more likely to break or be damaged, and thus more likely to allow moisture to penetrate. As a result, when the thickness of the first cover layer 123 is the same as the thickness of the second cover layer 125, there is a risk that the moisture resistance reliability of the multilayer ceramic capacitor may be deteriorated. To prevent this problem, in the multilayer ceramic capacitor according to the present embodiment, the thickness of the first cover layer 123 is formed to be larger than the thickness of the second cover layer 125. On the side of the first cover layer 123 that is thickened, the moisture permeation path is longer and thus the moisture resistance reliability degradation may be suppressed to a corresponding extent.

The height H of the exposed surfaces 173 and 183 may be smaller than the thickness T1 of the first cover layer 123. Here, H means a distance between the outer surface or an imaginary extension thereof of the first cover layer 123 in the thickness direction T of the ceramic body 12, and the edge of the connection portions 133 and 143 that is on the first cover layer 123 side. In other words, H means the length of the exposed surfaces 173 and 183 that are not covered by the connection portions 133 and 143 along the thickness direction T of the ceramic body 12. On the other hand, T1 means a distance between the internal electrode closest to the outer surface or an imaginary extension thereof of the first cover layer 123 in the thickness direction T of the ceramic body 12 among the plurality of first and second internal electrodes 21 and 22, and the outer surface or an imaginary extension thereof of the first cover layer 123 in the thickness direction T of the ceramic body 12.

If the height H of the exposed surfaces 173 and 183 is greater than the thickness T1 of the first cover layer 123, the performance of the multilayer ceramic capacitor may be degraded because the uppermost internal electrode may be drawn out to the exposed surfaces 173 and 183 but not connected to the connection portions 133 and 143 of the external electrodes 13 and 14.

Referring to FIG. 2, the multilayer ceramic capacitor 10 according to the present embodiment includes an active region A and a margin region M.

The active region A is a region where the plurality of first and second internal electrodes 21 and 22 overlap along the thickness direction T of the ceramic body 12, and the margin region M is a region between the active region A and the two end surfaces 153 and 163 of the ceramic body 12.

In the active region A, while the plurality of first and second internal electrodes 21 and 22 overlap, in the margin region M, the plurality of first internal electrodes 21 or the plurality of second internal electrode 22 are respectively disposed and do not overlap with each other. Therefore, there is a difference in the number of the internal electrodes between the active region A and the margin region M, and there may be a difference in thickness along the thickness direction T of the ceramic body 12 between the active region A and the margin region M accordingly. In other words, there may be a step in the margin region M. The presence of a step reduces the flatness of the ceramic body and prevents the multilayer ceramic capacitor from having an approximately rectangular parallelepiped shape, which may lead to mountability and reliability issues.

Meanwhile, since the ceramic body 12 is made of a ceramic material while the external electrodes 13 and 14 are made of a metal (for example, a nickel (Ni)), the difference in the shrinkage rate of the ceramic and the metal during sintering may create a zone of stress concentration in the ceramic body 12, resulting in warpage. If the warpage occurs, when mounting the multilayer ceramic capacitor on the circuit board, a crack may be generated.

The ceramic body 12 according to the present embodiment has a structure in which the thickness is smaller than the width. Since the ceramic body with this structure has a small thickness, there may be a high risk of physical damage such as cracks due to external impact when mounted on the substrate. Furthermore, the lack of flatness of the ceramic body can cause stresses to be concentrated in specific locations during substrate mounting, increasing the likelihood of fracture, resulting in degradation of electrical properties, as well as increasing the likelihood of moisture penetration through the fractured site.

Therefore, in the present embodiment, by disposing the dummy electrodes 15 and 15 in the first cover layer 123 of the ceramic body 12, the occurrence of steps is suppressed to improve flatness, while controlling the difference in shrinkage rate that occurs during the sintering and suppressing the occurrence of warpage.

The dummy electrodes 15 and 15 are provided in the first cover layer 123 which includes the first and second exposed surfaces 173 and 183. The dummy electrodes 15 and 15, like the first and second internal electrodes 21 and 22, may be formed by printing the conductive paste including the conductive metal on the dielectric layer 124.

The dummy electrodes 15 and 15 may be in contact with the first and second exposed surfaces 173 and 183 or project outwardly from the first and second exposed surfaces 173 and 183. For example, referring to FIG. 3, the end of the dummy electrode 15 is in contact with the first exposed surface 173, and referring to FIG. 4, the end of the dummy electrode 15 projects from the first exposed surface 173. In either case, the dummy electrodes 15 and 15 are arranged to extend inwardly from the first and second exposed surfaces 173 and 183 along the length direction L of the ceramic body 12.

The length L1 of the dummy electrode 15 may be equal to or smaller than the length L2 of the band portions 135 and 145. Here, L1 means the distance between both ends of each of the dummy electrodes 15 and 15 along the length direction L of the ceramic body 12, and L2 means the distance between the end surfaces 153 and 163 or an imaginary extension thereof of the ceramic body 12, and the edge of the band portions 135 and 145 that is opposite the end surfaces 153 and 163 of the ceramic body 12.

Also, the edges of the dummy electrodes 15 and 15 that are opposite the end surfaces 153 and 163 of the ceramic body 12 and the edges of the band portions 135 and 145 that are opposite the end surfaces 153 and 163 of the ceramic body 12 may be disposed on the same straight line along the thickness direction T of the ceramic body 12.

On the other hand, if the length L1 of the dummy electrode 15 is greater than the length L2 of the band portions 135 and 145, the ceramic body 12 may shrink further toward the dummy electrode 15, which may have a negative effect on preventing the flex crack.

The length L1 of the dummy electrode 15 may be greater than the length L3 of the margin region. Here, L3 means the distance between both ends of the margin region M along the length direction L of the ceramic body 12. If the length L1 of the dummy electrode 15 is smaller than the length L3 of the margin region, it is difficult to reduce the step in the margin region M, which may result in a lower flatness of the ceramic body 12.

The length L4 of the seed electrode layers 137 and 147 may be greater than the length L3 of the margin region M. Here, L4 means the distance between the end surfaces 153 and 163 or an imaginary extension thereof of the ceramic body 12 and the edges of the seed electrode layers 137 and 147 that are opposite the end surfaces 153 and 163 of the ceramic body 12.

On the other hand, the length L4 of the seed electrode layers 137 and 147 may be equal to or smaller than the length L2 of the band portions 137 and 147.

The dummy electrodes 15 and 15 may include a plurality of layers, and each layer of the dummy electrodes 15 and 15 may be spaced apart from each other in the thickness direction T of the ceramic body 12. Meanwhile, a plurality of layers of the dummy electrodes 15 and 15 may be disposed at uniform intervals along the thickness direction T of the ceramic body 12.

The dummy electrodes 15 and 15 may include nickel (Ni), copper (Cu), tin (Sn), palladium (Pd), gold (Au), or alloys thereof, but the present disclosure is not limited thereto.

The dummy electrodes 15 and 15 may partially overlap with the plurality of first and second internal electrodes 21 and 22 along the thickness direction T of the ceramic body 12.

As described above, in the multilayer ceramic capacitor 10 in which the ceramic body 12 has the exposed surfaces 173 and 183 exposed by the external electrodes 13 and 14, disposing the dummy electrodes 15 and 15 in the first cover layer 123 may improve flatness by controlling warping caused by the difference in shrinkage rates of the ceramic and the metal during sintering. In addition, if the dummy electrodes 15 and 15 are disposed inside the first cover layer 123, the flex cracks may be prevented from occurring when the multilayer ceramic capacitor 10 is mounted on the substrate.

In addition, in the multilayer ceramic capacitor 10 according to the present embodiment, by forming the first cover layer 123 thicker than the second cover layer 125, the moisture penetration path can be lengthened, thereby improving moisture resistance reliability.

Figure 7:
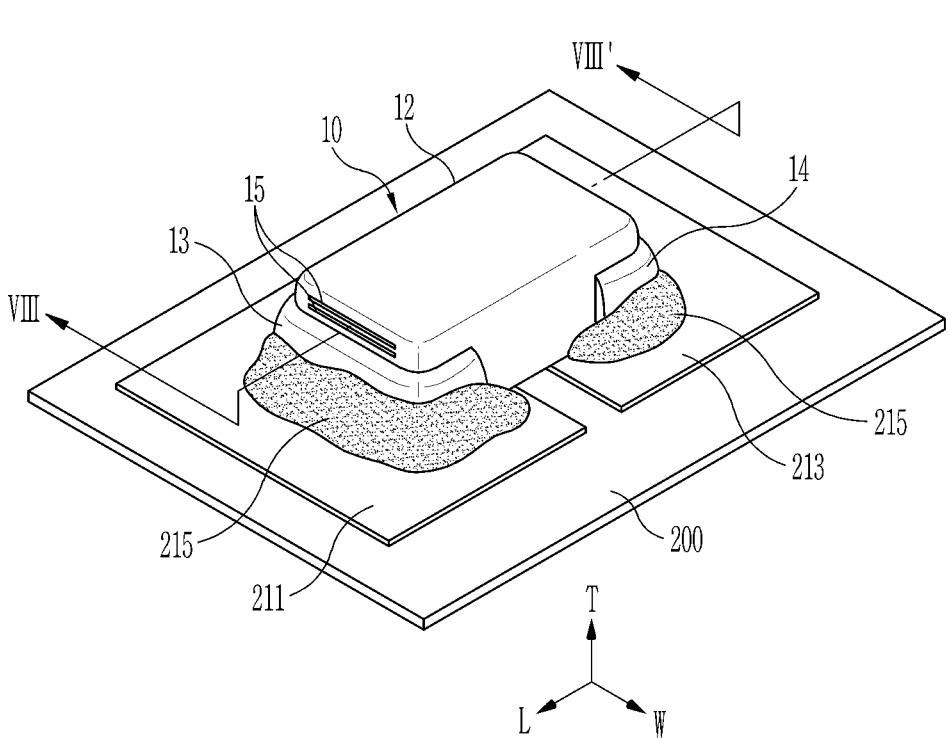
FIG. 7 is a schematic perspective view showing the multilayer ceramic capacitor shown in FIG. 1 is mounted on a substrate.
Figure 8:
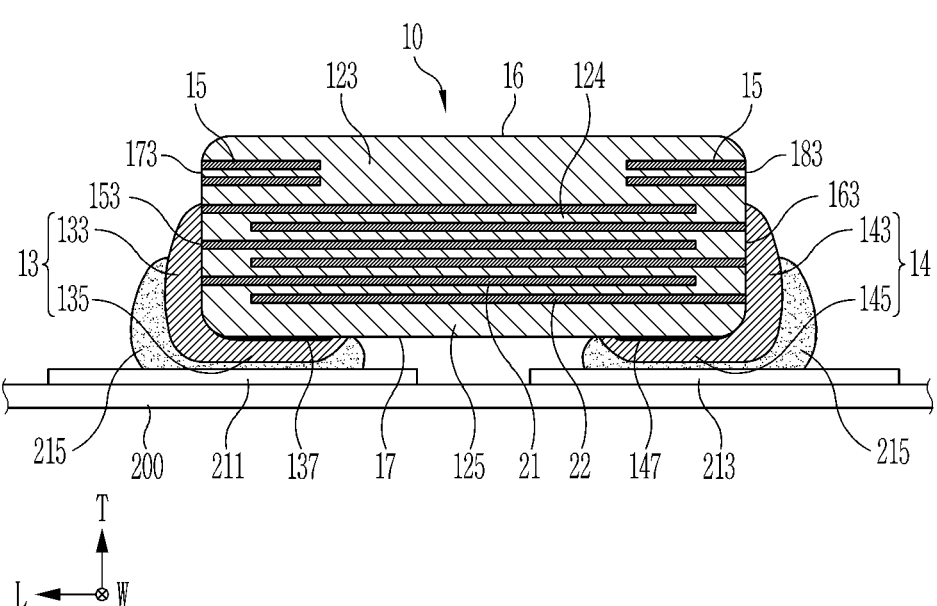
FIG. 8 is a cross-sectional view taken along line VIII-VIII' of FIG. 7.

FIG. 7 is a schematic perspective view showing the multilayer ceramic capacitor shown in FIG. 1 is mounted on a substrate. FIG. 8 is a cross-sectional view taken along line VIII-VIII' of FIG. 7.

Referring to FIG. 7 and FIG. 8, the multilayer ceramic capacitor 10 is connected to the first and second electrode pads 211 and 213 provided on the upper surface of the circuit board 200 through a conductive bonding member 215. That is, the multilayer ceramic capacitor 10 may be mounted on the circuit board 200 through the first and second electrode pads 211 and 213.

The first and second electrode pads 211 and 213 may be disposed to be spaced apart from each other on the upper surface of the circuit board 200. The band portions 135 and 145 of the first and second external electrodes 13 and 14 of the multilayer ceramic capacitor 10 may be secured to the circuit board 200 using the conductive bonding member 215 while disposed to be in contact with the first and second electrode pads 211 and 213. Meanwhile, the first and connection portions 133 and 143 of the first and second external electrodes 13 and 14 may also be covered with the conductive bonding member 215. Accordingly, the multilayer ceramic capacitor 10 may be electrically connected to the first and second electrode pads 211 and 213 of the circuit board 200. The conductive bonding member 215 may include, for example, a solder.

In the present embodiment, each of the first and second external electrodes 13 and 14 of the multilayer ceramic capacitor 10 is mounted to the circuit board 200 by being secured to the first and second electrode pads 211 and 213 by the conductive bonding member 215.

Figure 9:
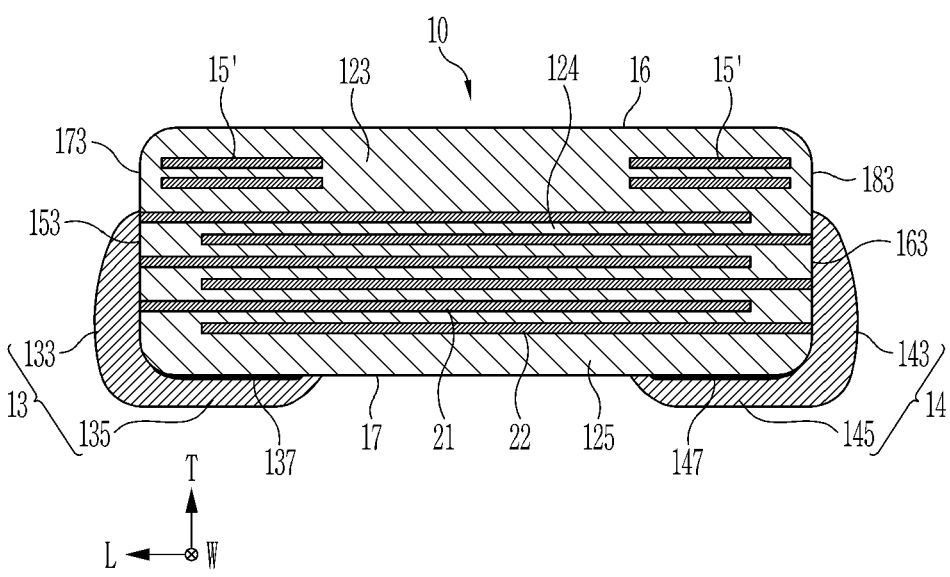
FIG. 9 is a schematic cross-sectional view showing a multilayer ceramic capacitor according to another embodiment of the present disclosure.

FIG. 9 is a schematic cross-sectional view showing a multilayer ceramic capacitor according to another embodiment.

Referring to FIG. 9, the dummy electrodes 15' and 15' extend along the length direction L of the ceramic body 12 within the first cover layer 123, but do not reach the first and second exposed surfaces 173 and 183 of the ceramic body 12. That is, there is a gap between the dummy electrodes 15' and 15' and the first and second exposed surfaces 173 and 183 of the ceramic body 12. Except for this, the multilayer ceramic capacitor according to the embodiment shown in FIG. 9 is the same as the multilayer ceramic capacitor according to the embodiment shown in FIG. 1, a description of the duplicated or identical portions will be omitted.

While the present disclosure has been described in connection with what is presently considered to be practical example embodiments, it is to be understood that the inventive concept(s) is not limited to the disclosed embodiments, but, on the contrary, is intended to cover various modifications and equivalent arrangements included within the spirit and scope of the appended claims.

DESCRIPTION OF SYMBOLS

10: multilayer ceramic capacitor
12: ceramic body
13, 14: external electrode
15, 15': dummy electrode
16: upper surface
17: lower surface
21, 22: internal electrode
123: first cover layer
124: dielectric layer
125: second cover layer
133, 143: connection portion
135, 145: band portion
137, 147: seed electrode layer
153: first end surface
163: second end surface
173: first exposed surface
183: second exposed surface
A: active region
M: margin region

What is claimed is:

1. A multilayer ceramic capacitor comprising:

a ceramic body having a predetermined size of length, width, and thickness, with the thickness being smaller than the width;

first and second external electrodes respectively including first and second connection portions covering a part of both end surfaces spaced apart from each other along a length direction of the ceramic body, and first and second band portions extending from the first and second connection portions, respectively, and covering a part of both side surfaces of the ceramic body in a width direction and a part of one surface in a thickness direction;

a plurality of first and second internal electrodes stacked within the ceramic body with a dielectric layer interposed therebetween and alternately drawn out to the both end surfaces of the ceramic body to be connected to the first and second external electrodes, respectively;

first and second cover layers respectively disposed outside on both sides of the plurality of first and second internal electrodes in the thickness direction within the ceramic body; and a dummy electrode disposed within the first cover layer, wherein the first cover layer includes an exposed surface, which is a portion of the both end surfaces of the ceramic body exposed by at least one of the first and second connection portions, and the dummy electrode is in contact with the exposed surface or spaced apart from the exposed surface in the length direction.

2. The multilayer ceramic capacitor of claim 1, wherein a length L1 of the dummy electrode is a distance between both ends of the dummy electrode along the length direction, a length L2 of one of the first and second band portions is a distance between an adjacent end surface of the both end surfaces of the ceramic body or an imaginary extension thereof and an edge of the one of the first and second band portions opposite the adjacent end surface of the ceramic body, and the length L1 of the dummy electrode is less than the length L2 of the one of the first and second band portions.

3. The multilayer ceramic capacitor of claim 1, wherein an edge of the dummy electrode opposite an adjacent end surface of the both end surfaces of the ceramic body and an edge of one of the first and second band portions opposite the adjacent end surface of the ceramic body are disposed on a same straight line in the thickness direction.

4. The multilayer ceramic capacitor of claim 1, further comprising:

an active region, which is a region where the plurality of first and second internal electrodes overlap in the thickness direction; and a margin region, which is a region between the active region and one of the both end surfaces of the ceramic body, wherein a length L1 of the dummy electrode is a distance between both ends of the dummy electrode in the length direction, a length L3 of the margin region is a distance between both ends of the margin region in the length direction, and the length L1 of the dummy electrode is greater than the length L3 of the margin region.

5. The multilayer ceramic capacitor of claim 1, wherein the dummy electrode comprises a plurality of layers.

6. The multilayer ceramic capacitor of claim 5, wherein the plurality of layers of the dummy electrode are spaced apart from one another in the thickness direction.

7. The multilayer ceramic capacitor of claim 1, wherein the dummy electrode includes nickel (Ni), copper (Cu), tin (Sn), palladium (Pd), gold (Au), or alloys thereof.

8. The multilayer ceramic capacitor of claim 1, wherein a thickness T1 of the first cover layer is a distance, in the thickness direction, between an internal electrode closest to an upper surface of the first cover layer in the thickness direction among the plurality of first and second internal electrodes, and the upper surface of the first cover layer or an imaginary extension thereof, a thickness T2 of the second cover layer is a distance, in the thickness direction, between an internal electrode closest to a lower surface of the second cover layer in the thickness direction among the plurality of first and second internal electrodes, and the lower surface of the second cover layer or an imaginary extension thereof, and the thickness T1 of the first cover layer is greater than the thickness T2 of the second cover layer.

9. The multilayer ceramic capacitor of claim 8, wherein the thickness T1 of the first cover layer is at least twice the thickness T2 of the second cover layer.

10. The multilayer ceramic capacitor of claim 1, wherein a height H of the exposed surface is a distance, in the thickness direction, between an upper surface of the first cover layer or an imaginary extension thereof and an edge of one of the first and second connection portions that is on the first cover layer, a thickness T1 of the first cover layer is a distance, in the thickness direction, between an internal electrode closest to the upper surface of the first cover layer in the thickness direction among the plurality of first and second internal electrodes, and the upper surface of the first cover layer or the imaginary extension thereof, and the height H of the exposed surface is smaller than the thickness T1 of the first cover layer.

11. The multilayer ceramic capacitor of claim 1, wherein the first and second band portions extend in the length direction from the first and second connection portions and cover a portion of the second cover layer.

12. The multilayer ceramic capacitor of claim 11, wherein a seed electrode layer is disposed between one of the first and second band portions and the second cover layer.

13. The multilayer ceramic capacitor of claim 12, further comprising:

an active region that is a region where the plurality of first and second internal electrodes overlaps in the thickness direction; and a margin region that is a region between the active region and one of the both end surfaces of the ceramic body, wherein a length L3 of the margin region is a distance between both ends of the margin region in the length direction, a length L4 of the seed electrode layer is a distance between an adjacent end surface of the both end surfaces of the ceramic body or an imaginary extension thereof and an edge of the seed electrode layer that is opposite the adjacent end surface of the ceramic body, and the length L4 of the seed electrode layer is greater than the length L3 of the margin region.

14. The multilayer ceramic capacitor of claim 13, wherein a length L2 of the one of the first and second band portions is a distance between the adjacent end surface of the ceramic body or the imaginary extension thereof and an edge of the one of the first and second band portions that is opposite the adjacent end surface of the ceramic body, and the length L4 of the seed electrode layer is less than the length L2 of the one of the first and second band portions.

15. A multilayer ceramic capacitor comprising:

a ceramic body having a predetermined size of length, width, and thickness, with the thickness being smaller than the width;

first and second external electrodes respectively including first and second connection portions covering a part of both end surfaces spaced apart from each other along a length direction of the ceramic body, and first and second band portions extending from the first and second connection portions, respectively, and covering a part of both side surfaces of the ceramic body in a width direction and a part of one surface in a thickness direction;

a plurality of first and second internal electrodes stacked within the ceramic body with a dielectric layer interposed therebetween and alternately drawn out to the both end surfaces of the ceramic body to be connected to the first and second external electrodes, respectively;

first and second cover layers respectively disposed outside on both sides of the plurality of first and second internal electrodes in the thickness direction within the ceramic body; and a dummy electrode disposed within the first cover layer, wherein the first cover layer includes an exposed surface, which is a portion of the both end surfaces of the ceramic body exposed by at least one of the first and second connection portions, and the dummy electrode protrudes outwardly from the exposed surface.

16. The multilayer ceramic capacitor of claim 15, wherein a length L1 of the dummy electrode is a distance between both ends of the dummy electrode along the length direction, a length L2 of one of the first and second band portions is a distance between an adjacent end surface of the both end surfaces of the ceramic body or an imaginary extension thereof and an edge of the one of the first and second band portions that is opposite the adjacent end surface of the ceramic body, and the length L1 of the dummy electrode is less than the length L2 of the band portion.

17. A multilayer ceramic capacitor comprising:

a ceramic body having a predetermined size of length, width, and thickness, with the thickness being smaller than the width;

first and second external electrodes respectively including first and second connection portions covering a part of both end surfaces spaced apart from each other along a length direction of the ceramic body, and first and second band portions extending from the first and second connection portions, respectively, and covering a part of both side surfaces of the ceramic body in a width direction and a part of one surface in a thickness direction;

a plurality of first and second internal electrodes stacked within the ceramic body with a dielectric layer interposed therebetween and alternately drawn out to the both end surfaces of the ceramic body to be connected to the first and second external electrodes, respectively;

first and second cover layers respectively disposed outside on both sides of the plurality of first and second internal electrodes in the thickness direction within the ceramic body; and a dummy electrode disposed within the first cover layer, wherein the first cover layer includes an exposed surface, which is a portion of the both end surfaces of the ceramic body exposed by at least one of the first and second connection portions, and the dummy electrode is located at a vertical position higher than upper ends of the first and second connection portions in the thickness direction with respect to the one surface of the ceramic body covered by the first and second band portions.

* * * * *